Patented May 16, 1944

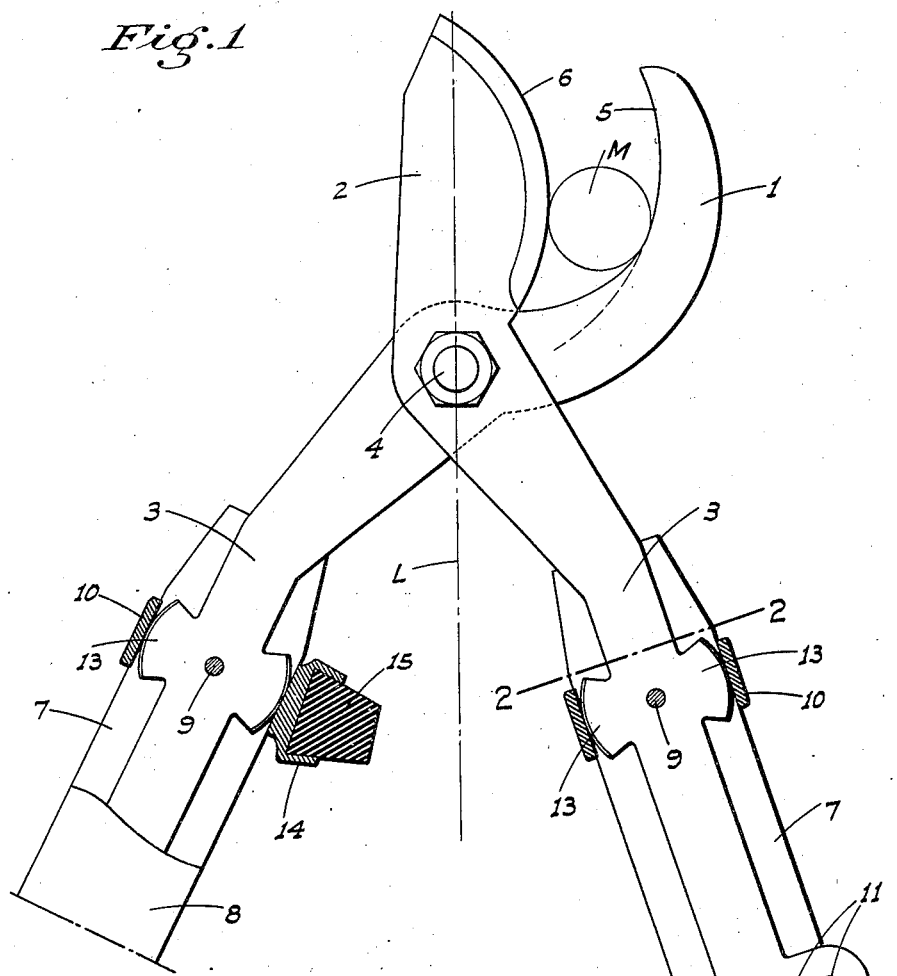
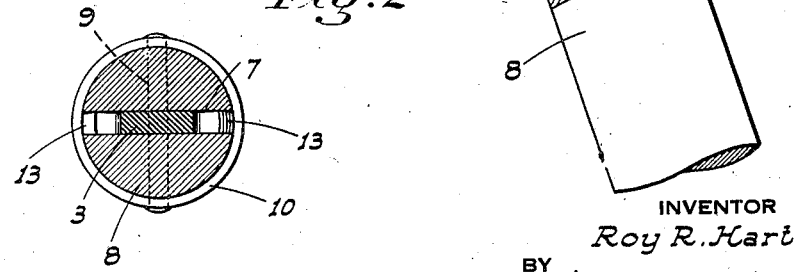

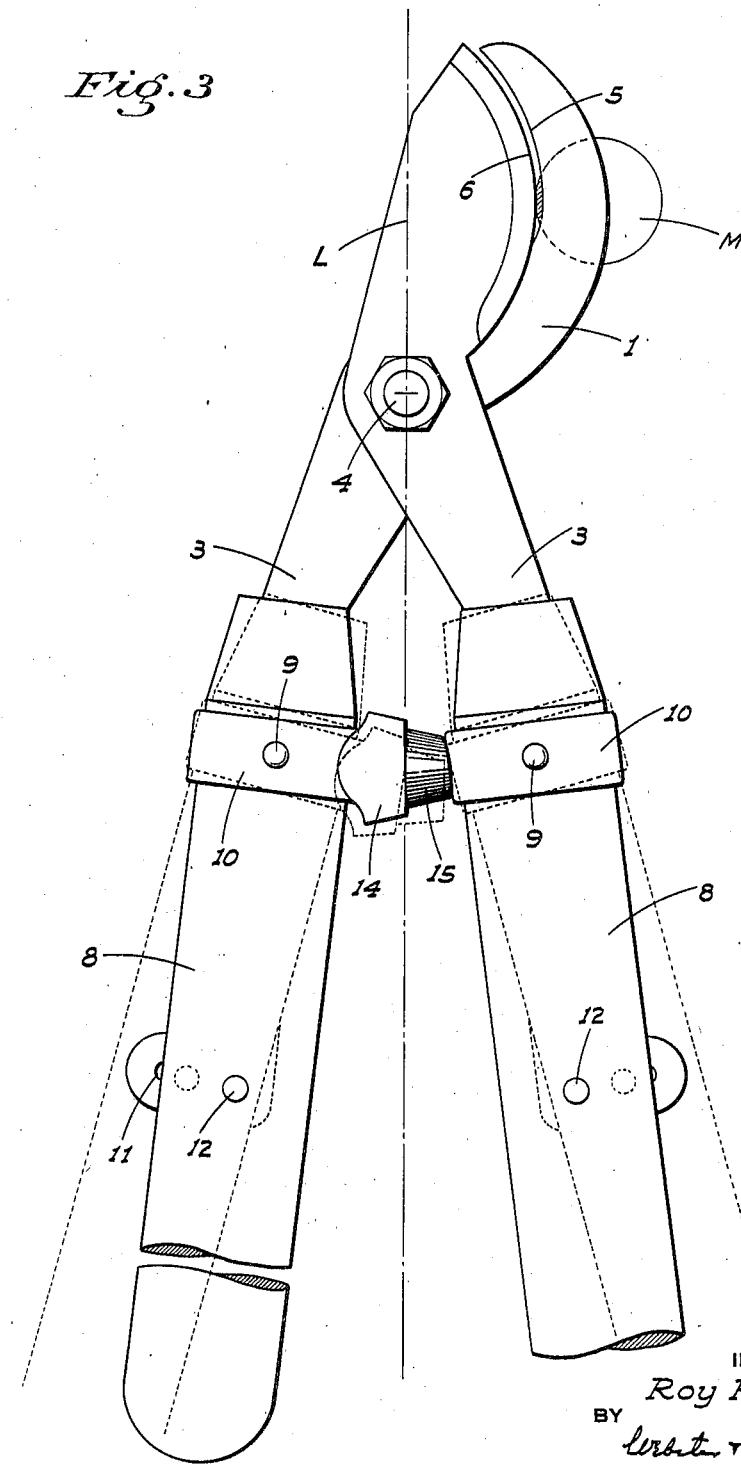

2,348,903

UNITED STATES PATENT OFFICE 2,348,903

PRUNING SHEARS

Roy R. Hart, San Jose, Calif.

Application May 29, 1943, Serial No. 489,048

5 Claims. (Cl. 30—254)

This invention relates to pruning shears of the hand operated, relatively heavy-duty type, and which as now constructed comprises a pair of cross pivoted blades adapted to overlap, handles for manipulating the blades, and a rigid stop limiting the overlapping movement of the blades. This stop is arranged so that it does not function until after the blades have overlapped some distance. Since the member being cut is completely severed before the blades overlap for any great portion of their length, an appreciable amount of blade movement takes place after such severance is complete and before the stop is engaged. The load on the blades being then released, this additional movement takes place suddenly and is then suddenly stopped. With any considerable amount of repeated use of the shears this imparts a very appreciable tiring shock or jar to the user, sometimes causing temporary paralysis of the wrists or arms or otherwise physically injuring the user.

The principal object of my invention is to eliminate this objectionable feature by a particular formation of blades and the use of a resilient stop so arranged that the stop is engaged before complete severance of the member being cut is effected, while allowing of the final movement of the blades into overlapping relationship to effect such complete severance. In this manner any shock or jar to the operator is eliminated.

Also in shears as ordinarily constructed the handles are rigid with the blades and in order to compensate for the wear of the blades and the consequent greater movement of the handles toward each other than required to cause the blades to overlap, the handles are disposed at such an angle to each other, in order to give hand clearance at all times, that when the shears are fully opened, the handles are widely spread.

It is another object of my invention to avoid this objectionable feature by mounting the handles in connection with the blades so that their angle may be adjusted, in order that the handles when brought together may always be disposed at approximately the same distance apart irrespective of blade wear.

A further object is to arranged the blades so that they may be more conveniently projected into engagement with a member to be cut than is the case with shears as ordinarily constructed.

In all, my shears provide an efficient labor saving implement and one which can be used with the least fatigue, while the cost of manufacture over ordinary shears is not materially increased.

These objects I accomplish by means of such structure and relative arrangement of parts as will fully appear by a perusal of the following specification and claims.

In the drawings similar characters of reference indicate corresponding parts in the several views:

Figure 1 is a fragmentary side elevation of my improved shears partly in section as open, and engaging a member to be cut.

Figure 2 is a cross section on the line 2—2 of Fig. 1.

Figure 3 is a side elevation of the shears with the blades approaching a fully closed position and when the stop is initially engaged.

Referring now more particularly to the characters of reference on the drawings, the shears comprises a hook-shaped cutting bar and a co-operating blade 2, the bar and blade having depending shanks 3. The blade and bar are disposed in crossing relation to each other as is customary, and are pivoted together by a bolt 4 adjacent the inception of the shanks.

The cutting edge 5 of the bar 1, and which is concave for approximately half of its length from the tip down, is on a curve substantially the same as that of the convex cutting edge 6 of the blade 2, and is arranged so as to be concentric therewith when the blade approaches a fully closed or engaging position with the bar, as shown in Fig. 3. Each shank projects into a slot 7 cut in the corresponding handle 8 from its upper end, said slot extending from side to side of the handle and the shank extending lengthwise of the latter. Each shank intermediate its ends is pivotally connected to its handle by a pin 9 extending therethrough transversely of the slot or parallel to the bolt 4, and mounted in a handle reinforcing band or collar 10 which is shrunk on the handle and prevents widening of the slot or splitting of the handle. This handle may thus swivel relative to the shank and blade about the pin 9 as an axis.

At its lower end the shank is provided with a row of holes 11 disposed on a circular line concentric with the pin 9, any one of such holes being engaged by a removable pin 12 mounted in the handle and extending across the slot. In this manner the handle is easily adjusted to and held in any desired position.

In order to take the strain off the pin 9, the shank is formed with lateral bosses 13 concentric with said pin and engaging the inner face of the collar 10 where the latter is exposed in the slot 7. The operating pressure is thus imparted from the handle to the shank through the collar rather than through the pin; the curved form of the bosses enabling the same proper engagement of the collar with the bosses to be had irrespective of the adjusted position of the handle relative to the shank.

One collar is formed on the side facing the other collar with a socket 14 in which a resilient rubber stop bumper 15 is mounted. This bumper is arranged to engage the other collar when the handles are brought together and the concentric edge portions of the blade and bar are still slightly spaced from each other as shown in Fig. 3. The resilient nature of the bumper, however, permits of further closing movement of the blade and bar so as to fully sever the member M being cut. The concentric arrangement of the cutting edges assures engagement of the stop before complete severance of the member irrespective of the position that the latter may occupy between said edges, since these edges naturally overlap practically simultaneously over their full extent.

Adjustability of the handles enables the same to be brought together as close when the implement is new, and when the blade is worn down; the bumper being then cut down in length correspondingly if necessary.

The cutting bar is disposed so that its tip is well to one side of a line L projecting through the bolt 4 substantially symmetrical to the handles, and on that side of the line opposite the corresponding shank 3. This greatly facilitates the initial engagement of the member to be cut with the shears, since the latter may be projected straight toward the member instead of having to swing the shears in a curve in order to engage the hook shaped bar 1 about said member as is the case with the ordinary shears.

It will be noted that the socket 14 is considerably larger at the base than at its outer end. This requires that the bumper be compressed and forced into place, so that it will then be tightly held and will not be liable to become loose and drop out.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A pruning shears comprising a pair of cooperating cutting members disposed in crossing relation and adapted to overlap when fully closed, a pivot connecting the members, handles rigid with the members for manipulating the same and yieldable stop means functioning upon closing movement of the members adjacent but before any overlap thereof occurs, the cutting edge of one member being convexly curved while the cutting edge of the other member is concavely curved; said edges being disposed so that substantial portions thereof from the tip down are substantially concentric with each other, and spaced slightly apart when the stop is initially engaged.

2. A pruning shears comprising a pair of cooperating cutting elements disposed in crossing relation, a pivot connecting the elements, shanks depending from the elements, handles depending from the shanks for manipulating the cutting elements, one handle having a longitudinal slot cut down from its upper end and into which the corresponding shank extends lengthwise, a pivot pin parallel to said pivot connecting said one handle and adjacent shank intermediate the ends of the latter to allow of swivel movement of said one handle relative to the corresponding shank, means between said handle and shank to hold said handle set in different selected positions, a collar secured on the slotted handle in which the pivot pin is mounted; the slot extending to the sides of the handle to expose opposed portions of the inner face of the collar, and laterally projecting bosses formed on the shank and engaging said collar face portions; the bosses being curved concentric with the pivot pin.

3. A pruning shears comprising a pair of cooperating cutting members disposed in crossing relation and having cutting edges adapted to abruptly overlap for the greater portion of their length only as the members are brought to a fully closed position, a pivot connecting the members, handles rigid with the members for manipulating the same and yieldable stop means functioning upon closing movement of the members, to a point adjacent but short of the inception of any overlap of said portion of the length of the cutting edges.

4. A pruning shears comprising a pair of cooperating cutting elements disposed in crossing relation, a pivot connecting the elements, shanks depending from the elements, handles depending from the shanks for manipulating the cutting elements, one handle having a longitudinal slot cut down from its upper end and into which the corresponding shank extends lengthwise, said shank being relatively narrow compared with the width of the handle, a pivot pin parallel to said pivot connecting said one handle and adjacent shank intermediate the ends of the latter and centrally of the width of the handle, adjacent the upper end thereof, and a removable pin parallel to said pivot pin projecting across the handle and slot and through a selected one of a number of closely spaced openings in the lower end of the shank.

5. A pruning shears comprising a pair of cooperating cutting members disposed in crossing relation and adapted to overlap when fully closed, a pivot connecting the members, handles rigid with the members for manipulating the same; the cutting edge of one member being convexly curved while the cutting edge of the other member is concavely curved and said edges being disposed so that substantial portions thereof from the tip down are substantially concentric with each other and are spaced apart slightly as the members approach a fully closed position, and a stop functioning to yieldably resist further closing movement of the members when the cutting edges have reached such concentric relationship.

ROY R. HART.